United States Patent
Waeller (10) Patent No.: US 9,395,915 B2
(45) Date of Patent: Jul. 19, 2016

(54) OPERATING METHOD FOR A DISPLAY DEVICE IN A VEHICLE

(75) Inventor: Christoph Waeller, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 406 days.

(21) Appl. No.: 13/515,472

(22) PCT Filed: Nov. 23, 2010

(86) PCT No.: PCT/EP2010/007099
§ 371 (c)(1),
(2), (4) Date: Aug. 6, 2012

(87) PCT Pub. No.: WO2011/069601
PCT Pub. Date: Jun. 16, 2011

(65) Prior Publication Data
US 2013/0176232 A1    Jul. 11, 2013

(30) Foreign Application Priority Data
Dec. 12, 2009  (DE) .......................... 10 2009 058 145

(51) Int. Cl.
*G06F 3/048*  (2013.01)
*G06F 3/0488*  (2013.01)
*B60K 35/00*  (2006.01)

(52) U.S. Cl.
CPC ............ *G06F 3/04886* (2013.01); *B60K 35/00* (2013.01); *G06F 3/0488* (2013.01); *G06F 3/04883* (2013.01); *B60K 2350/1024* (2013.01);
(Continued)

(58) Field of Classification Search
CPC .................. G06F 3/0488; B60K 35/00; B60K 2350/1032

USPC .............................................. 345/173; 701/36
See application file for complete search history.

(56) References Cited

U.S. PATENT DOCUMENTS

| | | | | |
|---|---|---|---|---|
| 6,163,863 A * | 12/2000 | Schicht | .................. | G11C 29/40 365/201 |
| 6,874,128 B1 * | 3/2005 | Moore | .................. | G06F 3/0486 715/759 |
| 7,705,833 B2 | 4/2010 | Kim | | |

(Continued)

FOREIGN PATENT DOCUMENTS

| | | |
|---|---|---|
| DE | 10 2007 061 993 | 7/2008 |
| EP | 1 837 748 | 9/2007 |

(Continued)

OTHER PUBLICATIONS

International Search Report, issued in corresponding International Application No. PCT/EP2010/007099.

(Continued)

*Primary Examiner* — Michael J Eurice
(74) *Attorney, Agent, or Firm* — Kenyon & Kenyon LLP (57) ABSTRACT

In an operating method for a display device in a vehicle, the display device includes a touch-sensitive surface. A first output is displayed in an area of the display device. A first movement and a second movement by an operator relative to the touch-sensitive surface are detected simultaneously. The area is divided automatically along a first direction into a first subarea and a second subarea, if the first movement and the second movement proceed substantially in a second direction perpendicular to the first direction and away from each other. The first output is displayed in the first subarea and a second output is displayed in the second subarea.

42 Claims, 3 Drawing Sheets

(52) U.S. Cl.
CPC .......... *B60K 2350/1032* (2013.01); *G06F 2203/04803* (2013.01)

(56) References Cited

U.S. PATENT DOCUMENTS

| | | | |
|---|---|---|---|
| 8,427,437 B2* | 4/2013 | Chae et al. | 345/173 |
| 8,547,347 B2* | 10/2013 | Chiang et al. | 345/173 |
| 8,547,354 B2* | 10/2013 | Koch | G06F 3/04886 178/18.01 |
| 8,677,284 B2* | 3/2014 | Aguilar | G06F 3/04815 715/830 |
| 2002/0113876 A1* | 8/2002 | Kim | B60R 25/1004 348/148 |
| 2003/0006892 A1* | 1/2003 | Church | B60K 35/00 340/439 |
| 2003/0023353 A1* | 1/2003 | Badarneh | B60K 35/00 701/1 |
| 2004/0141634 A1* | 7/2004 | Yamamoto | B60K 37/06 382/104 |
| 2004/0158374 A1* | 8/2004 | Suzuki | G01C 21/3664 701/36 |
| 2005/0063564 A1* | 3/2005 | Yamamoto | B60R 25/2045 382/104 |
| 2005/0162402 A1* | 7/2005 | Watanachote | G06F 3/03547 345/173 |
| 2005/0168330 A1* | 8/2005 | Ono | B60K 35/00 340/461 |
| 2005/0168441 A1* | 8/2005 | Obitsu | G06F 3/04883 345/157 |
| 2005/0170799 A1* | 8/2005 | Strandberg | H04H 40/18 455/186.1 |
| 2005/0267676 A1* | 12/2005 | Nezu | G06F 3/04883 701/532 |
| 2006/0020903 A1* | 1/2006 | Wang | G06F 3/0481 715/792 |
| 2006/0025920 A1* | 2/2006 | Nezu | G01C 21/36 701/532 |
| 2006/0066507 A1* | 3/2006 | Yanagisawa | B60K 35/00 345/7 |
| 2006/0164230 A1* | 7/2006 | DeWind | B60K 35/00 340/461 |
| 2006/0278155 A1* | 12/2006 | Soltendieck | B60K 37/02 116/62.4 |
| 2006/0287826 A1* | 12/2006 | Shimizu | B60K 35/00 701/431 |
| 2007/0078598 A1* | 4/2007 | Watanabe | B60K 37/02 701/429 |
| 2007/0222769 A1* | 9/2007 | Otsuka | G01C 21/3664 345/173 |
| 2008/0068284 A1* | 3/2008 | Watanabe | B60K 35/00 345/1.1 |
| 2008/0158189 A1* | 7/2008 | Kim | G06F 3/04886 345/173 |
| 2008/0161997 A1* | 7/2008 | Wengelnik | B60K 35/00 701/36 |
| 2008/0168403 A1* | 7/2008 | Westerman | G06F 3/04883 715/863 |
| 2008/0192024 A1* | 8/2008 | Mita | G06F 3/044 345/173 |
| 2008/0218481 A1* | 9/2008 | Watabe | G06F 3/0416 345/168 |
| 2009/0128508 A1* | 5/2009 | Sohn | G06F 3/0421 345/173 |
| 2009/0231145 A1* | 9/2009 | Wada | A61B 5/02416 340/575 |
| 2009/0249235 A1* | 10/2009 | Kim | G06F 3/0481 715/765 |
| 2009/0267921 A1* | 10/2009 | Pryor | B60K 35/00 345/177 |
| 2010/0079392 A1* | 4/2010 | Chiang | G06F 3/041 345/173 |
| 2010/0081475 A1* | 4/2010 | Chiang | G06F 3/0483 455/564 |
| 2010/0123669 A1* | 5/2010 | Chae | G06F 3/0488 345/173 |
| 2012/0192093 A1* | 7/2012 | Migos | G06F 3/04883 715/773 |

FOREIGN PATENT DOCUMENTS

| | | |
|---|---|---|
| EP | 2 169 523 | 3/2010 |
| EP | 2 177 983 | 4/2010 |
| JP | 09-134270 | 5/1997 |
| WO | 2009/088812 | 7/2009 |

OTHER PUBLICATIONS

German Search Report, issued in corresponding German Patent Application No. 10 2009 058 145.6.

International Preliminary Report on Patentability and Written Opinion, issued in corresponding International Application No. PCT/EP2010/007099.

* cited by examiner

OPERATING METHOD FOR A DISPLAY DEVICE IN A VEHICLE

FIELD OF THE INVENTION

The present invention relates to an operating method for a display device in a vehicle and a corresponding display device for a vehicle. In particular, the present invention relates to an operating method for dividing a display area of the display device in order to display outputs of different applications on the display device, the dividing being accomplished via a gesture which is detected with the aid of a touch-sensitive surface of the display device.

BACKGROUND INFORMATION

In vehicles such as automobiles or trucks, a multitude of information from various applications of the vehicle is typically displayed on a display device of the vehicle having a graphic display. The display device often has a touch-sensitive surface, which is superimposed on the display area of the display device in order to permit operator control of the various applications. Frequently, it is desirable and/or advantageous if outputs from two different applications are displayed on the display device. For example, an output from a navigation system may be output on one subarea of the display device, while information of an audio system, for instance, or a data management system that makes address data, so-called contact data, available may be output on another subarea of the display device. The result of a permanent division of the display area of the display device into a plurality of subareas is that only a small display area in one subarea of the display device is available for an application. Therefore, it is desirable to be able to dynamically split the display area of the display device in an easy manner into subareas for several applications.

In this connection, U.S. Patent Application Publication No. 2007/0222769 describes a display device in which a touch-detection section detects the location on a display screen where a user finger is touching the display screen. A transfer-length calculation section calculates the transfer length of the user's finger from the touch start location to the touch end location. A transfer-length judgment section judges whether or not the transfer length is greater than a reference transfer length. A shift calculation section calculates the shift of the user's finger. A shift judgment section judges whether or not the shift is less then a predetermined reference shift. If the transfer length is greater than the reference transfer length and the shift is less than the reference shift, a screen-split control section controls the operation of an image display section in such a way that the display screen is split.

If, when using the display device described in U.S. Patent Application Publication No. 2007/0222769, additional operating elements are represented on the display device which are able to be actuated by the user by touching them, it is possible that the gesture for dividing the screen may not be able to be distinguished clearly from an operating gesture, and thus the screen may be divided or an operating element may be actuated unintentionally.

SUMMARY

Therefore, example embodiments of the present invention provide an improved method for dividing a display area of a display device with the aid of a touch-sensitive surface. Moreover, example embodiments of the present invention provide an improved operator control of a display device when working with a divided display area.

According to example embodiments of the present invention, an operating method is provided for a display device in a vehicle, the display device including a touch-sensitive surface. In the method, a first output of a first application, for instance, is displayed on the display device in an area of the display device. The area on the display device is bounded by a first edge and a second edge opposite it in a first direction, as well as by a third edge and a fourth edge opposite it in a second direction. A movement by an operator relative to the touch-sensitive surface is detected and the area is divided automatically along the first direction into a first subarea and a second subarea, if the detected movement takes a course from the first edge to the second edge. On the other hand, if the detected movement goes from the third edge to the fourth edge, the area is divided automatically along the second direction into a first subarea and a second subarea. Moreover, the first output is displayed in the first subarea and a second output is displayed in the second subarea. For example, the first output may be the output of a first application and the second output may be the output of a second application which differs from the first application. For instance, the different applications may include a navigation system, a diagnostic system of the vehicle, a communication system of the vehicle, an audio system of the vehicle or an entertainment system of the vehicle. Outside of the area of the display device bounded by the four edges, further read-outs may be provided such as a status bar which displays an outside temperature, a time, etc. By dividing the area into two subareas, outputs from two different applications are able to be displayed simultaneously. In this manner, the user obtains an expanded overall view of the functions and states of the vehicle. In turn, each of the new subareas may be bounded by edges and may be further subdivided correspondingly by a movement of the operator relative to the touch-sensitive surface from one edge to an opposite edge. In this manner, even more outputs of further applications are able to be displayed simultaneously. For example, in this manner, the area is able to be subdivided into two, three or four subareas.

The first subarea and the second subarea may be joined again automatically to form the area, if the detected movement proceeds along a separating line that separates the first subarea from the second subarea. In this manner, it is easily and intuitively possible to combine subareas again to form one area. An output from one of the two previously output applications is then displayed in the combined area. For example, which output of which application is displayed on the combined area may be predefined or, for instance, may be the application which was used last in the divided view.

According to example embodiments of the present invention, a further operating method is provided for a display device in a vehicle. The display device includes a touch-sensitive surface. A first output is displayed on the display device in an area of the display device. A first movement and a second movement by an operator relative to the touch-sensitive surface are detected simultaneously. The area is divided automatically along a first direction into a first subarea and a second subarea, if the first movement and the second movement proceed substantially in a second direction perpendicular to the first direction and away from each other, that is, go in opposite directions within the second direction. If the first movement and the second movement proceed substantially in the first direction and away from each other, the area is divided automatically along the second direction into a first subarea and a second subarea. The first output is displayed in the first subarea and a second output is displayed in the second subarea.

For example, the first movement and the second movement may be produced by the operator spreading his/her thumb and index finger, which are touching the touch-sensitive surface. If the spreading movement takes place in the first direction, then the area is divided along the second direction, i.e., perpendicular to the spreading movement. Therefore, from the perspective of the user, by his/her spreading movement, the user is pulling the area apart, whereby it is divided. A simple dividing of the area is possible with the aid of this intuitive movement.

The joining of the first subarea and the second subarea to form the total area may be accomplished, for example, by movements opposite to the spreading movement, if the first movement begins in the first subarea, the second movement begins in the second subarea, and the first and second movements proceed substantially toward each other. If the first movement and the second movement are again produced with the thumb and index finger, the division may be canceled by a movement of thumb and index finger toward each other.

In still another operating method for a display device in a vehicle according to example embodiments of the present invention, a first output is displayed on the display device in an area of the display device, and an actuation of an operating element is detected. The area is divided automatically into a first subarea and a second subarea as a function of the actuation of the operating element. The first output is displayed in the first subarea and a second output is displayed in the second subarea.

For instance, the operating element may include a switch or pushbutton which is situated in the vicinity of the display device or on a steering wheel of the vehicle. Alternatively, the operating element may also include an operating element which is displayed on the display device and which may be actuated by touching a touch-sensitive surface of the display device.

By repeated actuation of the operating element, each of the two subareas may in turn be subdivided into two further subareas, so that four subareas are then made available for the display of four outputs of, e.g., four different applications of the vehicle. In this manner, the user is provided with a very fast and easy-to-use method for dividing the display area.

The joining of the first subarea and the second subarea to form the total area, or the four subareas to form the total area, may be accomplished, for instance, by a further actuation of the operating element. Alternatively, several operating elements may be provided for, respectively, dividing and joining the areas.

The area may be divided along a predetermined separating line along the first direction or the second direction, into the first subarea and the second subarea. By predetermining the separating line and dividing the area along the predetermined separating line, it is ensured that the resulting subareas have a suitable size. In addition, this also permits the operator to perform the dividing movement at any location on the display device, and nevertheless, the subareas are divided along the predetermined separating line. Because of this, less precision is required of the operator in executing the dividing movement.

According to example embodiments, in displaying the first output in the first subarea, a quantity of information of the first output is reduced, or dimensions of read-outs and operator interfaces of the first output are reduced, or an arrangement of read-outs and operator interfaces of the first output is altered.

In this manner, the clarity of the first output is able to be ensured, even on the smaller first subarea relative to the total area.

According to example embodiments, an approach of a body part of the operator to the display device is detected, and operator interfaces of the first or the second output are displayed as a function of the detected approach. Because the operator interfaces of the first and/or second output are only displayed when the operator approaches the display device with a body part, during normal viewing of the outputs on the display device, an uncluttered display without operator interfaces or with few operator interfaces is able to be achieved, thereby improving the clarity. As soon as the operator approaches the display device, further operator interfaces are displayed.

In addition, a first distance between an approaching body part of the operator and the first subarea and a second distance between the approaching body part of the operator and the second subarea may be measured. Operator interfaces of the first or of the second output are displayed as a function of the first and the second distance. For example, operator interfaces of the first output may be displayed if the first distance is less than the second distance, and operator interfaces of the second output may be displayed if the second distance is less than the first distance. In this manner, the operator interfaces are displayed only in the subarea which the operator would presumably like to control.

According to example embodiments, in the case of the operating method, an audio-output symbol is displayed on the display device. Furthermore, a movement by the operator, which begins at the audio output symbol, relative to the touch-sensitive surface is detected. The audio output symbol is moved on the display device according to the detected movement, and audio outputs, which are assigned to the subarea in which the audio output symbol is located, are output on an output medium assigned to the audio output symbol. For instance, the audio output medium may include a loudspeaker connection or a headphone terminal. For example, if an output of a navigation system is displayed on the display device in the first subarea and, for instance, an output of an audio system is displayed in the second subarea, by moving the audio output symbol, e.g., the loudspeaker connection, it may be determined in an easy manner from which application outputs are to be output to the loudspeaker connection. If the audio output symbol is moved into the subarea of the navigation system, audio outputs of the navigation system are output via the vehicle loudspeakers. If the audio output symbol is moved into the subarea of the audio system, then outputs of the audio system, e.g., of a radio or a CD, are output via the vehicle loudspeakers. In the same manner, with the aid of a further audio output symbol, e.g., for a headphone terminal, an audio output for the headphone terminal is able to be determined.

According to example embodiments of the present invention, a further method is provided for a display device of a vehicle. The display device has a touch-sensitive surface. In the method, a first output is displayed in a first subarea of the display device and a second output is displayed in a second subarea of the display device. In addition, a data object symbol is displayed in one of the subareas. A movement by an operator relative to the touch-sensitive surface and beginning at the data object symbol is detected, and the data object symbol is moved according to the detected movement on the display device. When the detected movement ends, data assigned to the data object symbol are transferred to an application which is assigned to the subarea in which the data object symbol is located when the detected movement ends.

For example, the data assigned to the data object symbol may include an entry in a contact list (address book), a significant point on a map (point of interest), a title of a piece of music played by a radio, a vehicle maintenance instruction and/or an appointment in an electronic appointment calendar. Because, with the aid of a movement on the touch-sensitive surface, the data object symbol is able to be transferred easily from one application which is displayed in a first subarea, to another application which is displayed in a second subarea, for example, a destination address for a navigation system is able to be programmed in an easy manner with, for instance, contact data from a telephone system of the vehicle.

For example, one of the methods previously described may be used to set up the subareas.

Furthermore, according to example embodiments of the present invention, a display device for a vehicle is provided that includes a display area having a touch-sensitive surface, and a processing unit. The processing unit may be adapted to carry out one or more of the previously described methods. For example, the display device may include an audio system, a navigation system, a diagnostic system and/or a communication system of the vehicle.

Further features and aspects of example embodiments of the present invention are explained in more detail below with reference to the appended Figures.

DETAILED DESCRIPTION

Figure 1A:
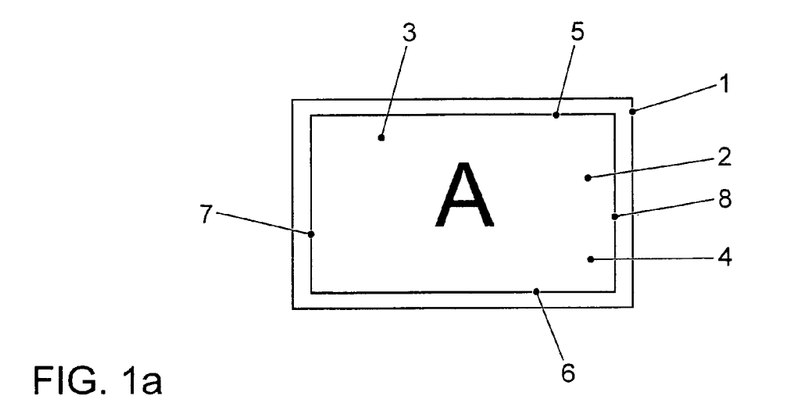
FIGS. 1a-1c show steps for dividing an area of a display device into subareas according to an example embodiment of the present invention.

FIG. 1a shows a display device 1 according to an example embodiment of the present invention. Display device 1 includes a display area 2 having an overlying touch-sensitive surface 3. For example, the display area may be a liquid crystal display which, with the aid of a matrix representation, is able to display both alphanumeric and graphical outputs. Shown on display area 2 in FIG. 1a is an area 4 on which an output A of an application or functionality of the vehicle such as a navigation system, an audio system, a communication system, (e.g., hands-free telephone) or an entertainment system of the vehicle is displayed. In this description, output A stands for a more or less extensive output of one of the previously named applications. Thus, for example, in the case of a navigation system, output A may include a map having a travel route marked in and/or an input mask for establishing a navigation destination. Area 4 is bounded by a top first edge 5, a second bottom edge 6 opposite it in a first direction, a third left edge 7 and a right edge 8 opposite it in a second direction. For example, edges 5-8 shown may coincide with the edges of display area 2, or may lie within the edges of display area 2, so that further areas of display area 2 remain outside of edges 5-8. For instance, below bottom edge 6, an area for a status bar may still remain on display area 2. A temperature reading or a time, for example, may be displayed in this status bar. For instance, edges 5-8 may be represented as lines on display device 1.

The application which provides output A is able to be controlled with the aid of touch-sensitive surface 3 in that, for example, operating elements are made visible in output A that are able to be actuated by a user by touching touch-sensitive surface 3.

Figure 1B:
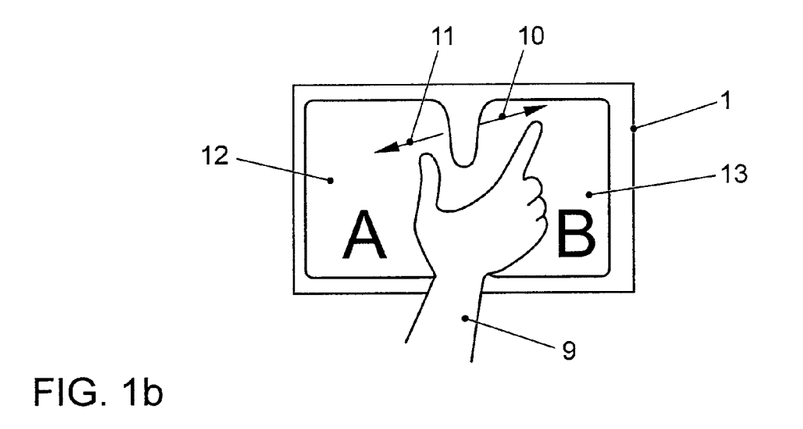
Figure 1C:
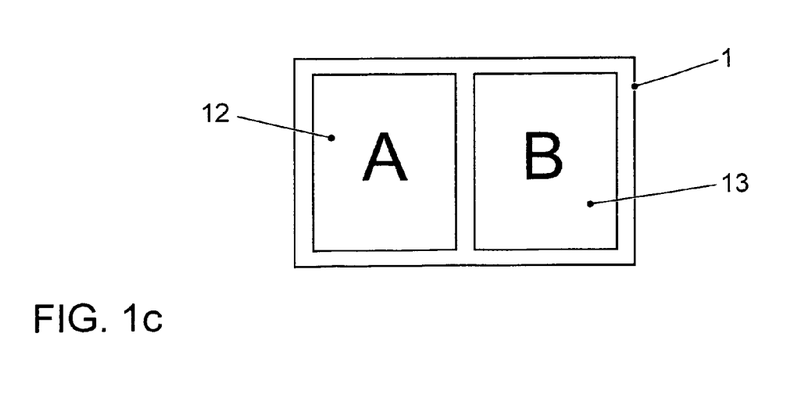

In order to permit the display of information from several applications simultaneously on display device 1, area 4 may be divided into two subareas. To that end, by performing a spreading gesture with two fingers, as shown in FIG. 1b, the user is able to divide area 4 into two subareas 12 and 13. For that purpose, for example, user 9 touches the touch-sensitive surface simultaneously with the thumb and index finger and, for instance, moves the thumb and index finger away from each other in the horizontal or vertical direction. In FIG. 1b, this is shown by arrows 10 and 11. The index finger of operator 9 moves horizontally in the direction of arrow 10, and the thumb moves horizontally in the opposite direction in the direction of arrow 11. Area 4 is thereby subdivided along a vertical direction into the two subareas 12 and 13. After the spreading movement, two subareas 12 and 13 now exist on display device 1, as shown in FIG. 1c. For example, output A is displayed in subarea 12, and an output B of a further application is displayed in subarea 13. For instance, output B may also include a selection menu for selecting the application to be displayed in subarea 13. Alternatively, the application displayed last in subarea 13 may be displayed automatically in subarea 13, as well. As an alternative, the spreading movement may also be carried out in the vertical direction, area 4 thereby being subdivided along a horizontal separating line into two subareas.

Figure 2A:
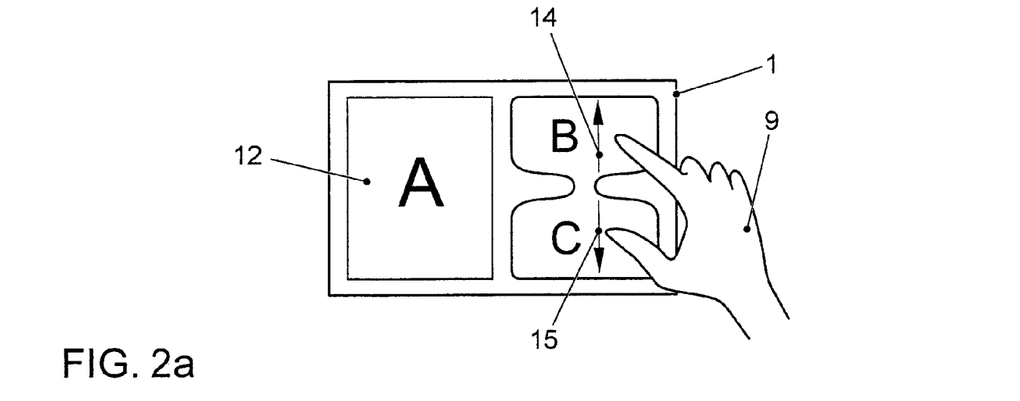
FIGS. 2a-2b show steps for dividing a subarea into further subareas according to an example embodiment of the present invention.
Figure 2B:
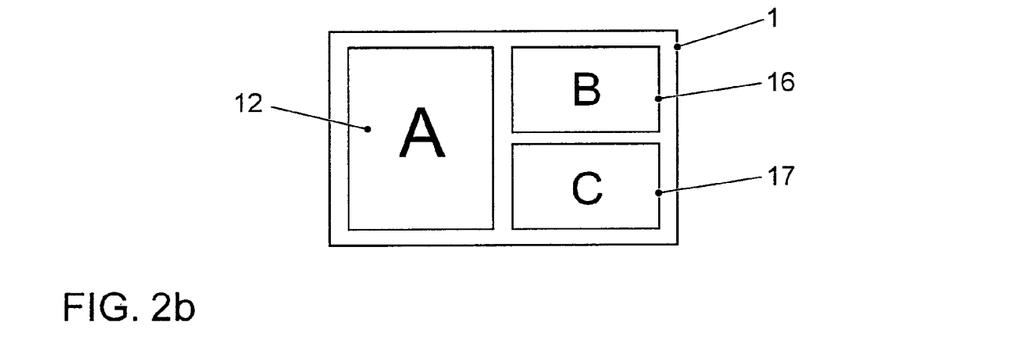

By performing a further spreading gesture within one of subareas 12, 13, in each case a further division is possible. For example, FIG. 2a shows how subarea 13 is divided into two further subareas by a spreading gesture. As shown in FIG. 2a, subarea 13 of FIG. 1c is touched by the thumb and index finger of operator 9, and the index figure moves in the direction of arrow 14, while the thumb moves in the opposite direction of arrow 15 over touch-sensitive surface 3. By this vertical spreading, subarea 13 is divided along a horizontal separating line into two subareas 16 and 17. FIG. 2b shows the result of this division. Three subareas are now shown on display device 1, which are able to be used by three different applications to allow outputs A, B and C to be displayed in their own respective subareas 12, 16 and 17. For example, output B of previously undivided subarea 13 is displayed in subarea 16, and, e.g., output C of a further application is displayed in subarea 17.

In the same manner as subarea 13, subarea 12 may be split into two further subareas, which is not shown, however, for the sake of clarity. Further divisions may be allowed, depending on the size of display device 1. For instance, for display devices having a diagonal of approximately 25 cm, the division may be limited, e.g., to a maximum of four areas. Larger display devices are able to permit a division into six or eight subareas, for example. On the other hand, smaller display devices may be limited to a division into a maximum of two subareas.

Subareas 12, 13, 16 and 17 may be determined in terms of their size either by the location of the corresponding dividing movements by which they are produced, or alternatively, with the aid of predefined separating lines. In the event of predefined separating lines, for the case of FIG. 1b, it does not matter in what horizontal position the spreading movement takes place. The subareas are always produced along the predetermined separating line.

If operator 9 performs a compressing gesture in which two fingers are moved toward each other, two subareas are able to be united again to form one area. To that end, the starting positions of the fingers must in each case lie in one of the respective subareas to be reunited. For example, starting from FIG. 1c, subareas 12 and 13 are able to be united to form area 4 by, for instance, placing the thumb in subarea 12 and the index finger in subarea 13 on the touch-sensitive surface. By bringing the thumb and index finger together in the direction of the boundary between subareas 12 and 13, subareas 12 and 13 are joined to form area 4 of FIG. 1a.

Since the display area of subareas 12 and 13 is smaller than the display area of total area 4, an output, e.g., output A, may be adapted as a function of the display area available. For instance, a quantity of information in output A may be reduced if output A is displayed in subarea 12. In the same manner, read-outs and operator interfaces may be enlarged or reduced, depending on the display area available. Likewise, the arrangement of read-outs and operator interfaces may be adjusted as a function of the display area available and its geometry.

Display device 1 may further include an approach detection, which is already able to detect an approach by user 9 prior to a contact between user 9 and touch-sensitive surface 3. As a function of the approach detection, operator interfaces, for instance, which are components of outputs A or B, may be enlarged or made visible in response to an approach to display device 1. This permits optimal use of the display area, since outputs such as a map depiction, for example, are only hidden by operating elements when user 9 approaches display device 1.

Moreover, the approach detection may be implemented such that it is able to detect an individual approach to the respective subareas. For example, if operator 9 approaches subarea 12 of FIG. 1c, then, for instance, operating elements are shown enlarged only in output A as a function of the distance of operator 9 from subarea 12. On the other hand, if operator 9 approaches subarea 13, then operating elements of output B are shown enlarged as a function of this approach.

Figure 3:
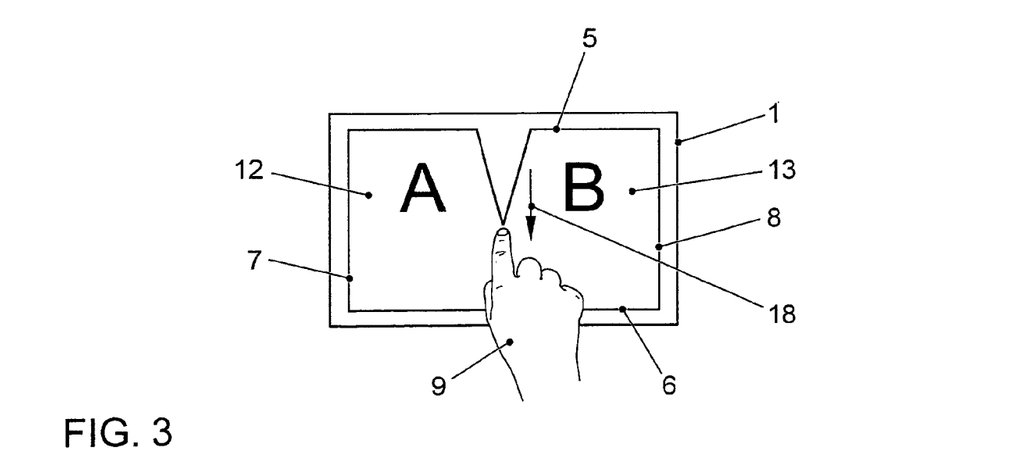
FIG. 3 shows a division of an area of a display device into two subareas according to an example embodiment of the present invention.

FIG. 3 shows an example embodiment for a method for dividing a display on a display device 1. The initial state of display device 1 corresponds to that which was described in connection with FIG. 1a. In order to divide area 4, user 9 touches one of edges 5-8 and performs a touching movement up to opposite edge 5-8 on touch-sensitive surface 3. In the example shown in FIG. 3, user 9 has touched top edge 5, for example, and starting from there, goes with a finger in the direction of arrow 18 to bottom edge 6. Area 4 is thereby divided into two subareas 12 and 13 along a vertical separating line from edge 5 to edge 6. The result of the division corresponds to that which was described in connection with FIG. 1c. Alternatively, user 9 may also execute a horizontal movement between edges 7 and 8 in order to divide area 4 along a horizontal separating line. As described in connection with FIG. 2b, subareas 12 and 13 may likewise be further subdivided, by the user performing a touching movement from one edge to an opposite edge of the subarea to be divided. Applications which make outputs A, B or C available frequently also require audio outputs, that are to be output simultaneously with the display. Examples for such applications are an audio system, a hands-free telephone, a media player system or a navigation system. For instance, an audio output system of the vehicle may include several loudspeakers in the vehicle as well as one or more headphone terminals. By a symbol which denotes the loudspeakers or one of the headphone terminals of the audio system, a current assignment of the loudspeakers and the headphone terminals to the applications is able to be shown by displaying the corresponding symbol in the corresponding outputs A, B or C. Thus, for example, one application may display a loudspeaker symbol in output A, another application may display a headphone symbol in output B, and yet another application may display no audio output symbol in assigned output C. If the user would like to assign the loudspeakers to application C, for instance, he would touch the loudspeaker symbol in output A and move this symbol by a touching movement in the direction of output C.

Figure 4A:
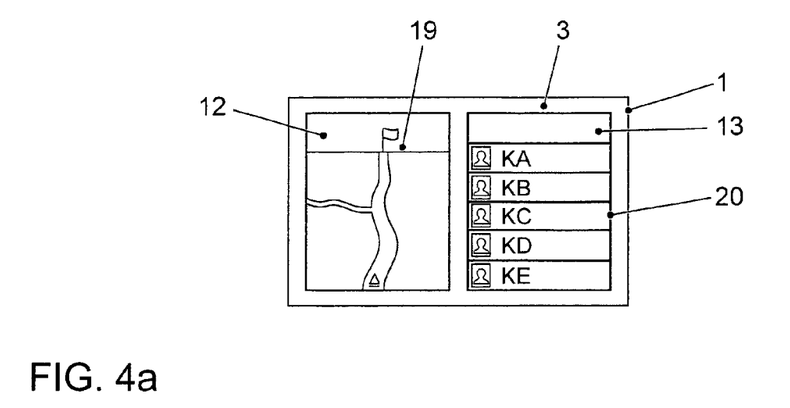
FIGS. 4a-4c show a transfer of data with the aid of a data object symbol according to an example embodiment of the present invention.

Starting from the divided representation having subareas 12 and 13 shown in FIG. 1c, in the following, it is described how information is able to be exchanged in an easy manner between two applications which display their outputs A and B in subareas 12 and 13. FIG. 4a shows schematically a map depiction 19 of a navigation system in subarea 12. A contact list 20 of, for instance, an address book of a hands-free telephone of the vehicle is shown in subarea 13. Contact list 20 includes several entries KA, KB, KC, KD and KE. For instance, each entry may be assigned a name, a telephone number and an address. The operator control of the hands-free speaking system is accomplished via outputs and operating elements in subarea 13. In addition, each entry KA-KE shows what is termed a data object symbol. By moving a data object symbol, such as address entry KB, from subarea 13 to subarea 12, a destination address is able to be established for the navigation system. To that end, operator 9 touches data object symbol KB in subarea 13 and guides it, with the aid of a touching movement, across touch-sensitive surface 3 from subarea 13 into subarea 12, as shown by arrow 21 in FIG. 4b. In subarea 12, as shown in FIG. 4c, operator 9 is thereupon asked to confirm whether the address of transferred data object symbol KB is to be used as the new destination. The actuation of operator interface "OK" in subarea 12 confirms the new destination and a suitable route is calculated by the navigation system.

Figure 4B:
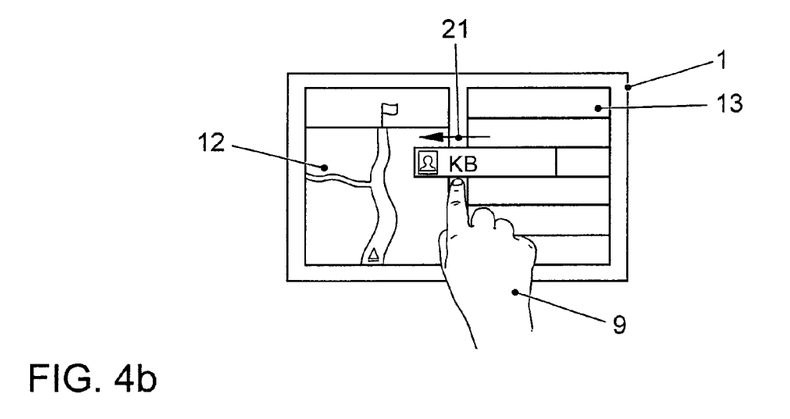
Figure 4C:
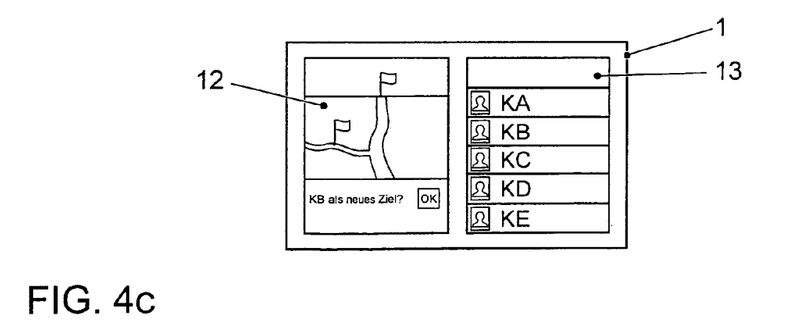

The transfer of address information from a hands-free speaking system, for example, to, e.g., a navigation system, as was described in connection with FIGS. 4a-4b, is only an example. Further examples are:

Transfer of a significant point on a map, a so-called point of interest (POI), into a contact list of an address book, for example, in order to store this POI as a contact in the address book;

Transfer of a music title which is displayed by a radio application, for example, to an application of a playback device for playing any media in order, for instance, to search in the playback device for music titles having a similar sound and to play them, or to acquire this music title, e.g., via the Internet and a suitable data connection, and to store it in the playback device;

Transfer of a vehicle maintenance instruction from an application which provides vehicle data to a navigation system of the vehicle in order to display garages on a map of the navigation system that are suitable for carrying out the maintenance measures on the vehicle according to the maintenance instruction;

Transfer of an appointment from an appointment calendar application into a navigation application in order to program a location of the appointment as destination for the navigation system;

Transfer of an appointment from an appointment calendar application to an address book application in order to store persons involved in the appointment as contacts in the address book.

What is claimed is:

1. An operating method for a display device in a vehicle, comprising:
    displaying a first output on the display device in an area of the display device;
    detecting an actuation of an operating element;
    automatically dividing the area into a first subarea and a second subarea as a function of the actuation of the operating element such that the first subarea and the second subarea have a predetermined size independent of a location of the actuation of the operating element;
    automatically subdividing at least one of the first and/or second subarea in at least one additional subarea as a function of the actuation of the operating element; and
    displaying the first output in the first subarea, displaying a second output in the second subarea, and displaying an additional output in the additional subarea, wherein the operating element is at least one of a switch and a push-button, positioned on a steering wheel in the vehicle.

2. The method according to claim 1, further comprising:
    detecting a further actuation of the operating element; and
    joining the first subarea and the second subarea to form the area as a function of the further actuation of the operating element, wherein at least one of a predetermined application and a last-used application uses the area.

3. The method according to claim 1, wherein the area is divided along a predetermined separating line along the first direction or the second direction into the first subarea and the second subarea.

4. The method according to claim 1, wherein the display of the first output in the first subarea includes:
    reducing an amount of information in the first output;
    reducing dimensions of read-outs and operator interfaces of the first output; and/or
    altering an arrangement of read-outs and operator interfaces of the first output.

5. The method according to claim 1, further comprising:
    detecting an approach of a body part of the operator to the display device; and
    displaying and re-sizing operator interfaces of the first output and/or the second output as a function of the detected approach.

6. The method according to claim 1, further comprising:
    detecting a first distance between an approaching body part of the operator and the first subarea;
    detecting a second distance between the approaching body part of the operator and the second subarea; and
    displaying and re-sizing operator interfaces of the first output or the second output as a function of the first distance and the second distance.

7. The method according to claim 1, further comprising:
    displaying an audio output symbol on the display device, the display device having a touch-sensitive surface;
    detecting a movement, beginning at the audio output symbol, by an operator relative to the touch-sensitive surface;
    moving the audio output symbol on the display device according to the detected movement; and
    outputting audio outputs, assigned to the subarea in which the audio output symbol is located, on an audio output medium assigned to the audio output symbol, wherein the audio output medium includes a headphone terminal.

8. An operating method for a display device in a vehicle, the display device having a touch-sensitive surface, comprising:
    displaying a first output in a first subarea of the display device;
    displaying a second output in a second subarea of the display device;
    displaying a data object symbol in one of the subareas;
    detecting a movement, beginning at the data object symbol, by an operator relative to the touch-sensitive surface;
    moving the data object symbol on the display device according to the detected movement between the subareas; and
    transferring data assigned to the data object symbol to an application assigned to the subarea in which the data object symbol is located when the detected movement ends, wherein the data assigned to the data object symbol includes at least one of an entry in a contact list, a maintenance instruction from the vehicle, and an appointment in an electronic appointment calendar;
    wherein transferring the maintenance instruction to a navigation application triggers depiction, on a map, of garages that are suitable for carrying out corresponding maintenance measures on the vehicle.

9. The method according to claim 8, wherein the data assigned to the data object symbol is a title of a piece of music played by a radio and the transferring triggers at least one of searching in a playback device for other music titles having a similar sound and playing them, and acquiring the piece of music and storing it in the playback device.

10. The method according to claim 8, wherein an area of the display device is bounded by a first edge, a second edge opposite the first edge in a first direction, a third edge, and a fourth edge opposite the third edge in a second direction, the method further comprising:
    automatically dividing the area along the first direction into the first subarea and the second subarea, in response to detecting movement over a course from the first edge toward the second edge; and
    automatically dividing the area along the second direction into the first subarea and the second subarea, in response to detecting movement over a course from the third edge toward the fourth edge.

11. The method according to claim 8, further comprising:
    simultaneously detecting a first movement and a second movement by an operator relative to the touch-sensitive surface;
    automatically dividing an area of the display device along a first direction into the first subarea and the second subarea, in response to detecting the first movement and the second movement proceeding substantially in a second direction perpendicular to the first direction and away from each other; and
    automatically dividing the area along the second direction into the first subarea and the second subarea, in response to detecting the first movement and the second movement proceeding substantially in the first direction and away from each other.

12. The method according to claim 8, further comprising:
    detecting an actuation of an operating element; and
    automatically dividing an area of the display device into the first subarea and the second subarea as a function of the actuation of the operating element.

13. A display device for a vehicle, comprising:
    a display area;
    an operating element; and
    a processing unit adapted:
        to display a first output on the display device in an area of the display device;
        to divide the area into a first subarea and a second subarea as a function of an actuation of the operating element;

to subdivide at least one of the first and/or second subarea in at least one additional subarea as a function of the actuation of the operating element; and to display the first output in the first subarea, to display a second output in the second subarea, and to display an additional output in the additional subarea;

wherein the operating element is at least one of a switch and a pushbutton, positioned on a steering wheel in the vehicle.

14. The display device according to claim 13, wherein the display device includes at least one of an audio system, a navigation system, a diagnostic system, and a communication system of the vehicle.

15. The display device according to claim 13, wherein the display device is adapted to perform an operating method including:

displaying a first output on the display device in an area of the display device, the area being bounded by a first edge, a second edge opposite the first edge in a first direction, a third edge, and a fourth edge opposite the third edge in a second direction;

detecting a movement by an operator relative to the touch-sensitive surface;

automatically dividing the area along the first direction into a first subarea and a second subarea, in response to detecting movement over a course from the first edge toward the second edge;

automatically dividing the area along the second direction into a first subarea and a second subarea, in response to detecting movement over a course from the third edge toward the fourth edge; and displaying the first output in the first subarea and displaying a second output in the second subarea.

16. The display device according to claim 13, wherein the display device is adapted to perform an operating method including:

displaying a first output on the display device in an area of the display device;

simultaneously detecting a first movement and a second movement by an operator relative to the touch-sensitive surface;

automatically dividing the area along a first direction into a first subarea and a second subarea, in response to detecting the first movement and the second movement proceeding substantially in a second direction perpendicular to the first direction and away from each other;

automatically dividing the area along the second direction into a first subarea and a second subarea, in response to detecting the first movement and the second movement proceeding substantially in the first direction and away from each other; and displaying the first output in the first subarea and displaying a second output in the second subarea.

17. The display device according to claim 13, wherein the display device is adapted to perform an operating method including:

displaying a first output on the display device in an area of the display device;

detecting an actuation of an operating element;

automatically dividing the area into a first subarea and a second subarea as a function of the actuation of the operating element; and displaying the first output in the first subarea and displaying a second output in the second subarea.

18. The display device according to claim 13, wherein the display device is adapted to perform an operating method including:

displaying a first output in a first subarea of the display device;

displaying a second output in a second subarea of the display device;

displaying a data object symbol in one of the subareas;

detecting a movement, beginning at the data object symbol, by an operator relative to the touch-sensitive surface;

moving the data object symbol on the display device according to the detected movement; and transferring data assigned to the data object symbol to an application assigned to the subarea in which the data object symbol is located when the detected movement ends.

19. A display device for a vehicle, comprising:

a display area having a touch-sensitive surface; and a processing unit adapted:

to display a first output in a first subarea of the display device;

to display a second output in a second subarea of the display device;

to display a data object symbol in one of the subareas;

to detect a movement, beginning at the data object symbol, by an operator relative to the touch-sensitive surface;

to move the data object symbol on the display device according to the detected movement between the subareas; and to transfer data assigned to the data object symbol to an application assigned to the subarea in which the data object symbol is located when the detected movement ends, wherein the data assigned to the data object symbol includes at least one of an entry in a contact list, a maintenance instruction from the vehicle, and an appointment in an electronic appointment calendar;

wherein transferring the maintenance instruction to a navigation application triggers depiction, on a map, of garages that are suitable for carrying out corresponding maintenance measures on the vehicle.

20. The display device according to claim 19, wherein the display device is adapted to perform an operating method including:

displaying a first output on the display device in an area of the display device, the area being bounded by a first edge, a second edge opposite the first edge in a first direction, a third edge, and a fourth edge opposite the third edge in a second direction;

detecting a movement by an operator relative to the touch-sensitive surface;

automatically dividing the area along the first direction into a first subarea and a second subarea, in response to detecting movement over a course from the first edge toward the second edge;

automatically dividing the area along the second direction into a first subarea and a second subarea, in response to detecting movement over a course from the third edge toward the fourth edge; and displaying the first output in the first subarea and displaying a second output in the second subarea.

21. The display device according to claim 19, wherein the display device is adapted to perform an operating method including:

displaying a first output on the display device in an area of the display device;

simultaneously detecting a first movement and a second movement by an operator relative to the touch-sensitive surface;

automatically dividing the area along a first direction into a first subarea and a second subarea, in response to detecting the first movement and the second movement proceeding substantially in a second direction perpendicular to the first direction and away from each other;

automatically dividing the area along the second direction into a first subarea and a second subarea, in response to detecting the first movement and the second movement proceeding substantially in the first direction and away from each other; and displaying the first output in the first subarea and displaying a second output in the second subarea.

22. The display device according to claim 19, wherein the display device is adapted to perform an operating method including:

displaying a first output on the display device in an area of the display device;

detecting an actuation of an operating element;

automatically dividing the area into a first subarea and a second subarea as a function of the actuation of the operating element; and displaying the first output in the first subarea and displaying a second output in the second subarea.

23. The display device according to claim 19, wherein the display device is adapted to perform an operating method including:

displaying a first output in a first subarea of the display device;

displaying a second output in a second subarea of the display device;

displaying a data object symbol in one of the subareas;

detecting a movement, beginning at the data object symbol, by an operator relative to the touch-sensitive surface;

moving the data object symbol on the display device according to the detected movement; and transferring data assigned to the data object symbol to an application assigned to the subarea in which the data object symbol is located when the detected movement ends.

24. The display device according to claim 19, wherein the data assigned to the data object symbol is a title of a piece of music played by a radio and the transfer triggers the processing unit to at least one of search in a playback device for other music titles having a similar sound and play them, and acquire the piece of music and store it in the playback device.

25. An operating method for a display device in a vehicle, the display device having a touch-sensitive surface, comprising:

depicting a first output of a first application in an area of the display device;

receiving an area-splitting instruction from an operator;

responsively dividing the area into a first subarea and a second subarea, wherein each subarea is assigned to a different application and is further divisible into at least one additional subarea in response to a further area-splitting instruction;

displaying an output from each assigned application in each subarea;

detecting an approach of an operator body part to the display device; and selectively re-sizing an operator interface of at least one subarea as a function of the detected approach;

wherein the assigned applications operate at least one of a diagnostic system, a navigation system, a communication system, an audio system, an electronic appointment calendar system, and an entertainment system, of the vehicle.

26. The method according to claim 25, wherein the re-sizing further comprises at least one of:

reducing an amount of information in the subarea;

reducing dimensions of read-outs and the operator interface in the subarea;

increasing an amount of information in the subarea;

increasing dimensions of read-outs and the operator interface in the subarea; and altering an arrangement of read-outs and the operator interface in the subarea.

27. The method according to claim 25 further comprising rejoining at least two subareas into an area in response to an area-joining instruction from an operator, wherein at least one of a predetermined application and a last-used application uses the area.

28. The method according to claim 25, wherein operator instructions are input by at least one of an operating element on a steering wheel in the vehicle and by movements by the operator relative to the touch-sensitive surface.

29. The method according to claim 25, wherein the detecting comprises, for each subarea, measuring a distance between the approaching operator body part and the subarea.

30. The method according to claim 29, wherein the re-sizing of each subarea is a function of each measured distance.

31. The method according to claim 25 further comprising:

displaying a data object symbol in one of the subareas;

detecting a movement, beginning at the data object symbol, by the operator relative to the touch-sensitive surface;

moving the data object symbol on the display device according to the detected movement between the subareas; and transferring data assigned to the data object symbol to an application assigned to the subarea in which the data object symbol is located when the detected movement ends.

32. The method according to claim 31, wherein transferring a maintenance instruction generated by a diagnostic system to a navigation application triggers depiction, on a map, of garages that are suitable for carrying out corresponding maintenance measures on the vehicle.

33. The method according to claim 31, wherein the data assigned to the data object symbol is a title of a piece of music played by a radio and the transferring triggers at least one of searching in a playback device for other music titles having a similar sound and playing them, and acquiring the piece of music and storing it in the playback device.

34. A display device for a vehicle, comprising:

a display area having a touch-sensitive surface; and a processing unit adapted to:

depict a first output of a first application in an area of the display device;

receive an area-splitting instruction from an operator;

responsively divide the area into a first subarea and a second subarea, wherein each subarea is assigned to a different application and is further divisible into at least one additional subarea in response to a further area-splitting instruction;

display an output from each assigned application in each subarea;

detect an approach of an operator body part to the display device; and selectively re-size an operator interface of at least one subarea as a function of the detected approach;

wherein the assigned applications operate at least one of a diagnostic system, a navigation system, a communication system, an audio system, an electronic appointment calendar system, and an entertainment system, of the vehicle.

35. The display device according to claim 34, wherein the re-sizing further comprises at least one of:
- reducing an amount of information in the subarea;
- reducing dimensions of read-outs and the operator interface in the subarea;
- increasing an amount of information in the subarea;
- increasing dimensions of read-outs and the operator interface in the subarea; and
- altering an arrangement of read-outs and the operator interface in the subarea.

36. The display device according to claim 34, wherein the processing unit is further adapted to rejoin at least two subareas into an area in response to an area-joining instruction from an operator, wherein at least one of a predetermined application and a last-used application uses the area.

37. The display device according to claim 34, wherein operator instructions are input by at least one of an operating element on a steering wheel in the vehicle and by movements by the operator relative to the touch-sensitive surface.

38. The display device according to claim 34, wherein the detecting comprises, for each subarea, measuring a distance between the approaching operator body part and the subarea.

39. The display device according to claim 38, wherein the re-sizing of each subarea is a function of each measured distance.

40. The display device according to claim 34, wherein the processing unit is further adapted to:
- display a data object symbol in one of the subareas;
- detect a movement, beginning at the data object symbol, by the operator relative to the touch-sensitive surface;
- move the data object symbol on the display device according to the detected movement between the subareas; and
- transfer data assigned to the data object symbol to an application assigned to the subarea in which the data object symbol is located when the detected movement ends.

41. The display device according to claim 40, wherein transferring a maintenance instruction generated by a diagnostic system to a navigation application triggers depiction, on a map, of garages that are suitable for carrying out corresponding maintenance measures on the vehicle.

42. The display device according to claim 40, wherein the data assigned to the data object symbol is a title of a piece of music played by a radio and the transferring triggers at least one of searching in a playback device for other music titles having a similar sound and playing them, and acquiring the piece of music and storing it in the playback device.

* * * * *